(12) United States Patent
Xie et al.

(10) Patent No.: US 8,184,745 B2
(45) Date of Patent: May 22, 2012

(54) SYSTEM AND METHOD OF GENERATING SOFT BITS

(75) Inventors: Kai Xie, Santa Clara, CA (US); Sattar Elyasi, San Jose, CA (US)

(73) Assignee: Altobridge Limited, Tralee, Co Kerry (IE)

( * ) Notice: Subject to any disclaimer, the term of this patent is extended or adjusted under 35 U.S.C. 154(b) by 667 days.

(21) Appl. No.: 12/328,359

(22) Filed: Dec. 4, 2008

(65) Prior Publication Data

US 2010/0142649 A1 Jun. 10, 2010

(51) Int. Cl.
*H04B 1/10* (2006.01)

(52) U.S. Cl. ........ 375/320; 375/348; 375/262; 375/316; 375/329; 375/340; 375/341; 375/342

(58) Field of Classification Search ............... 375/320, 375/348, 262, 316, 329, 340, 341, 342
See application file for complete search history.

(56) References Cited

U.S. PATENT DOCUMENTS

| | | |
|---|---|---|
| 4,183,054 A | 1/1980 | Patisaul et al. |
| 4,611,323 A | 9/1986 | Hessenmüller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |
| 5,321,849 A | 6/1994 | Lemson |
| 5,339,184 A | 8/1994 | Tang |

(Continued)

FOREIGN PATENT DOCUMENTS

EP 0391597 10/1990

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner* — Siu Lee
(74) *Attorney, Agent, or Firm* — Bryan Cave LLP

(57) ABSTRACT

A receiver receives a received signal from a communication link, the received signal comprising a stream of symbols modulated onto a carrier, each of the stream symbols selected from a constellation of symbols to represent a plurality of encoded data bits. The receiver comprises a demodulator to produce a stream of received symbols derived from the received signal; a channel decoder to produce a received stream of data bits derived from the stream of received symbols; and a memory device to store information related to the plurality of symbols in the constellation. For each of the symbols in the stream of received symbols, the demodulator: determines which of the plurality of symbols in the constellation is a respective closest symbol to that received symbol; identifies a respective nearest neighbor symbol for each data bit represented by the closest symbol for that received symbol based on the information stored in the memory device; and for each data bit represented by the respective closest symbol for that received symbol, subtracts the distance between the respective closest symbol and that received symbol from the distance between the respective nearest neighbor symbol and that received symbol in order to produce respective soft bits for that received symbol.

20 Claims, 4 Drawing Sheets

U.S. PATENT DOCUMENTS

| | | | |
|---|---|---|---|
| 7,464,318 B2 * | 12/2008 | Koslov et al. | 714/759 |
| 2004/0240591 A1 * | 12/2004 | Sexton et al. | 375/341 |
| 2005/0157822 A1 * | 7/2005 | Khandekar et al. | 375/340 |
| 2007/0033476 A1 * | 2/2007 | Osnato et al. | 714/746 |
| 2007/0297360 A1 * | 12/2007 | Joachim et al. | 370/329 |
| 2008/0285685 A1 * | 11/2008 | Chang et al. | 375/324 |
| 2009/0323795 A1 * | 12/2009 | Stirling-Gallacher | 375/232 |
| 2009/0323866 A1 * | 12/2009 | Bui et al. | 375/340 |

FOREIGN PATENT DOCUMENTS

| | | |
|---|---|---|
| WO | 9115927 | 10/1991 |

OTHER PUBLICATIONS

Harvey et al., "Cordless Communications Utilising Radio Over Fibre Techniques for the Local Loop", "IEEE International Conference on Communications", , pp. 1171-1175, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

* cited by examiner

SYSTEM AND METHOD OF GENERATING SOFT BITS

BACKGROUND

In many digital modulation schemes, binary data is mapped onto modulation symbols. In many such schemes, there are more than two possible different modulation symbols, which means each modulated symbol contains more than 1 bit of information. Symbols received at a receiver may be corrupted by noise. Thus, due to the randomness characteristic of noise, a recovered sequence of bits from received symbols could have errors in it. In other words, each recovered bit is not guaranteed to be the original transmitted bit. Some of the recovered bits are more likely to be wrong than others. Soft bits, also referred to as reliability information, are used to indicate the probability of each recovered bit to be in error. This "soft information" is especially useful for an error control decoder.

Typical digital modulation schemes calculate the soft bits through a series of computationally intensive equations. For example, in a constellation having 8 symbols, such as in the 8-PSK modulation scheme, each symbol represents three bits of data. In order to calculate soft bits, a distance between the received symbol and each symbol in the constellation, as well as the minimum values of 6 groups of distance values are calculated. In particular, the six groups of distance values are the groups having a 0 or 1 in the first bit, a 0 or 1 in the second bit, and a 0 or 1 in the third bit. For example, given the exemplary constellation 100 in FIG. 1, the soft bits are calculated using the three equations below:

$$z_{3i} = \min(M_{i1}, M_{i2}, M_{i3}, M_{i4}) - \min(M_{i0}, M_{i5}, M_{i6}, M_{i7});$$

$$z_{3i+1} = \min(M_{i3}, M_{i4}, M_{i5}, M_{i6}) - \min(m_{i0}, M_{i1}, M_{i2}, M_{i7});$$

$$z_{3i+2} = \min(m_{i2}, M_{i3}, M_{i7}, M_{i8}) - \min(m_{i0}, M_{i1}, M_{i4}, M_{i5}))$$

In the above equations, the quantity $M_{ij}$ represents the distance between the received symbol and one of the symbols in the constellation. The subscript i is the received symbol index and the subscript j is the constellation symbol index. Performing these calculation for each received symbol can be computationally intensive because the calculations involve complex numbers and square roots. In addition, other constellations that map more than 3 bits to each symbol will have additional equations to be solved, one for each soft bit.

SUMMARY

In one embodiment a receiver is provided that receives a received signal from a communication link, the received signal comprising a stream of symbols modulated onto a carrier, each of the stream symbols selected from a constellation of symbols to represent a plurality of encoded data bits. The receiver comprises a demodulator to produce a stream of received symbols derived from the received signal; a channel decoder to produce a received stream of data bits derived from the stream of received symbols; and a memory device to store information related to the plurality of symbols in the constellation. For each of the symbols in the stream of received symbols, the demodulator: determines which of the plurality of symbols in the constellation is a respective closest symbol to that received symbol; identifies a respective nearest neighbor symbol for each data bit represented by the closest symbol for that received symbol based on the information stored in the memory device; and for each data bit represented by the respective closest symbol for that received symbol, subtracts the distance between the respective closest symbol and that received symbol from the distance between the respective nearest neighbor symbol and that received symbol in order to produce respective soft bits for that received symbol.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

Figure 1:
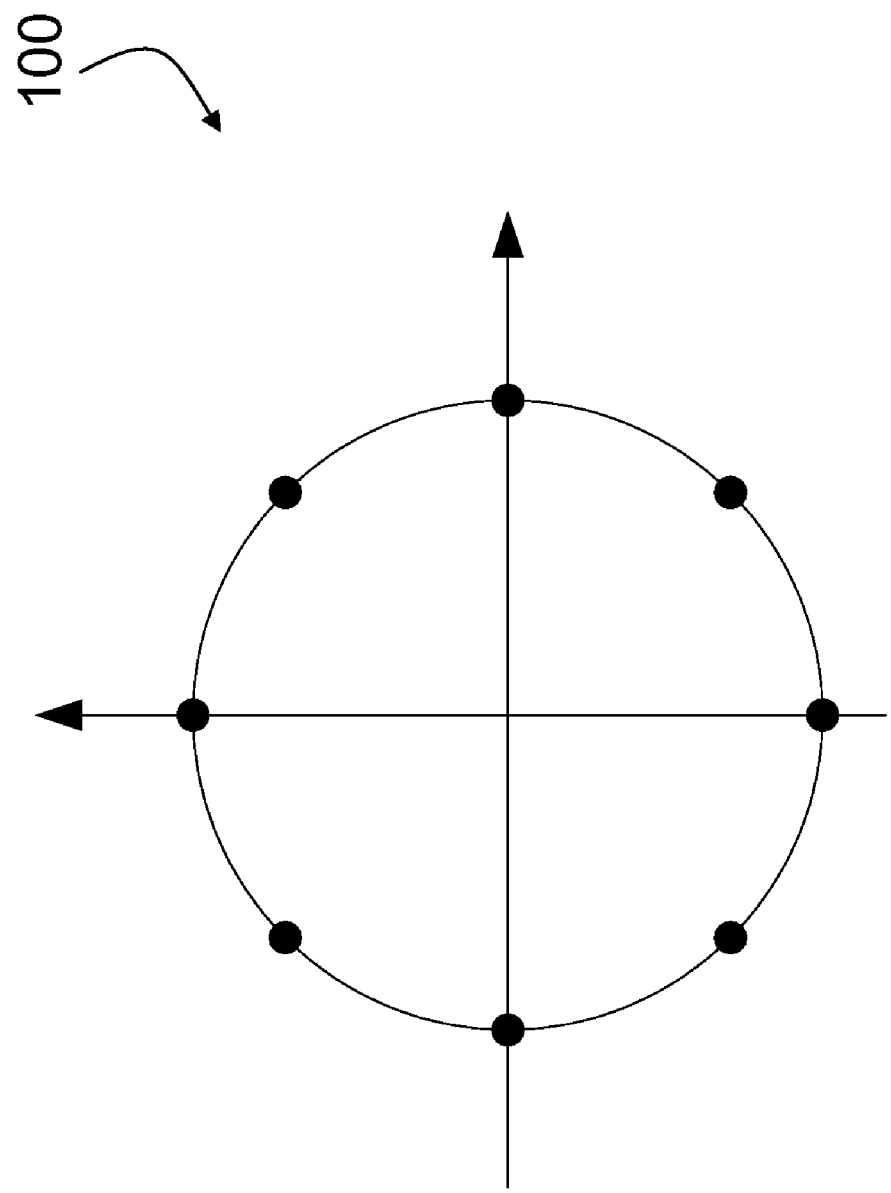
FIG. 1 is a diagram of one example of a constellation

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures or the specification is not to be construed as limiting the order in which the individual steps may be performed. The following detailed description is, therefore, not to be taken in a limiting sense.

Figure 2:
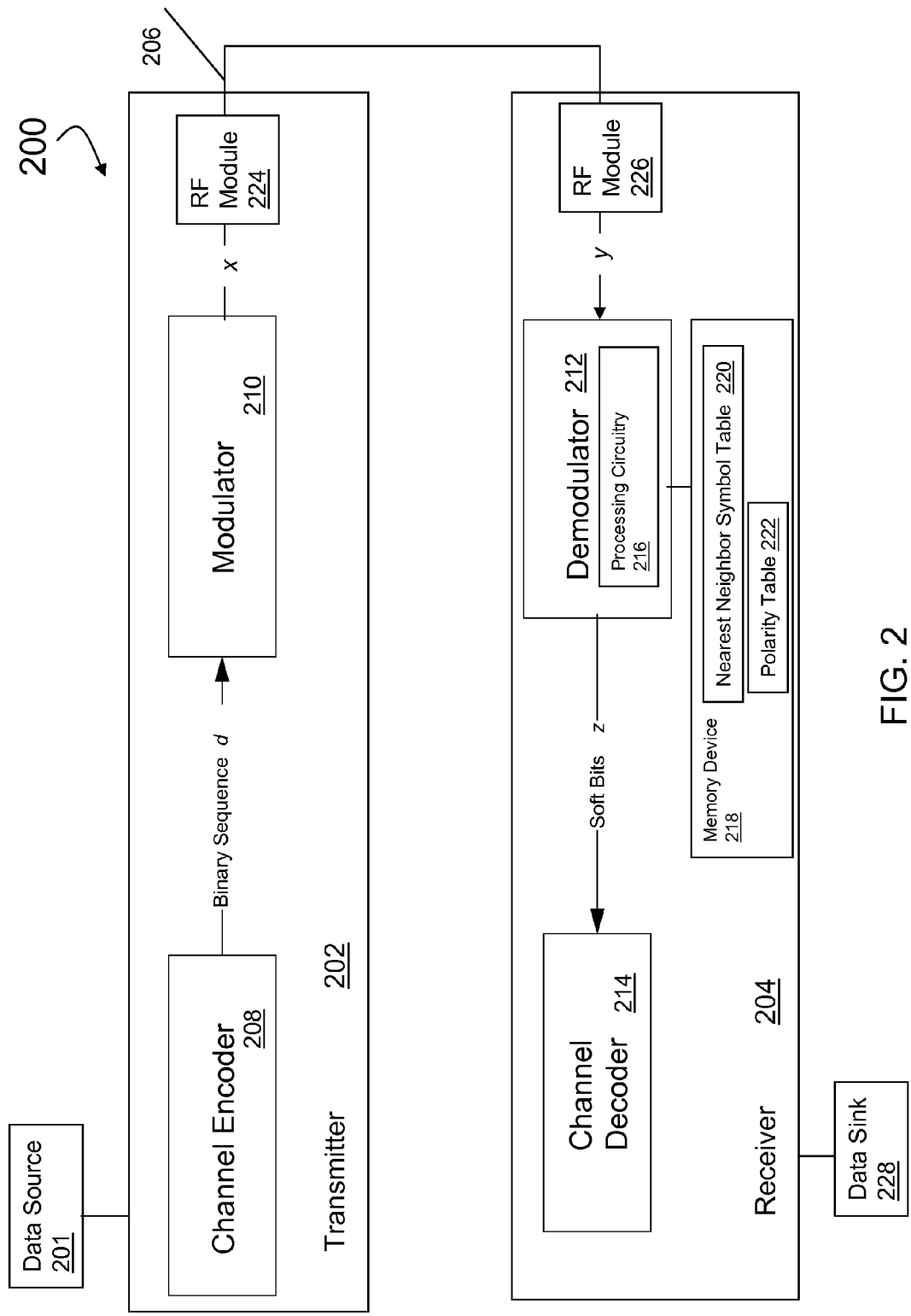
FIG. 2 is a block diagram of one embodiment of a communication system.

FIG. 2 is a block diagram of one embodiment of a communication system 200. Communication system 200 includes a transmitter 202 and a receiver 204. Transmitter 202 is operable to transmit modulated communication signals over link 206 to receiver 204. Receiver 204 demodulates the communication signals and performs error correction routines to reduce the effects of noise in the received modulated signal.

Although only the transmitter 202 and the only the receiver 204 are shown at the respective ends of the communication link 206 in FIG. 2, it is to be understood that typically each end of the communication link 206 will have both a transmitter and receiver (to support bi-directional communication). Also, although the transmitter 202 and receiver 204 are shown as separate devices in FIG. 2, in some implementations, the receiver and transmitter at each end of the link 206 are integrated into a single device (sometimes referred to as a "transceiver"). Thus, in such implementations, each of transmitter 202 and receiver 204 include both a transmitter and receiver integrated into a single device.

Transmitter 202 comprises a channel encoder 208 and a modulator 210. Channel encoder 208 encodes data bits received from a data source 201 to produce a binary sequence, $d=[d_0, d_1 \ldots d_N]$. The binary sequence d is output from the channel encoder 208 to modulator 210. Modulator 210 is operable to map each of the bits in binary sequence d to one of a plurality of symbols in a constellation such that each symbol represents a plurality of bits. For example, in some embodiments, modulator 210 is operable to map binary sequence d using a phase-shift keying (PSK) modulation scheme which uses a constellation such as the exemplary constellation shown in FIG. 1. In particular, the PSK constellation shown in FIG. 1 is a constellation used in a Global System for Mobile communications (GSM) 8-PSK modulation scheme. However, in other embodiments, other modulation schemes such as 16-bit or 64-bit Quadrature Amplitude Modulation (QAM) are used. For example, in some embodiments, a QAM modulation scheme based on the IEEE 802.16e standard is used (such as the exemplary constellation 300 shown in FIG. 3). Although specific exemplary modulation schemes are mentioned herein, it is to be understood that other modulation schemes can be used which map a binary sequence of bits to a plurality of symbols which each represent a plurality of bits.

Modulator 210 outputs a modulated sequence of symbols, $x=[x_0, x_1 \ldots x_M]$. The modulated sequence x is transmitted to receiver 204 via communication link 206. Link 206 comprises any wired or wireless medium suitable for communication signals, such as, but not limited to, fiber optic cable, coaxial cable, twisted pair cable, and wireless radio frequency (RF) communication signals. Hence, modulator 210 is operable to modulate symbol sequence x for transmission over link 206. For example, in this exemplary embodiment, the transmitter 202 further comprises an RF module 224. The RF module 224 receives the modulated sequence x produced by the modulator 210 and produces an RF signal suitable for transmission on the link 206. For example, in one implementation where the modulator 210 outputs a digital baseband modulated signal having in-phase (I) and quadrature (Q) components, the RF module 224 performs an up-conversion operation to up-convert the baseband signal to an appropriate RF frequency and performs a digital-to-analog (D/A) operation to produce an analog signal suitable for transmission.

During transmission over link 206, various sources of noise can corrupt or alter symbol sequence x. Thus, receiver 204 receives a symbol sequence, $y=[y_0, y_1 \ldots y_M]$, which may be different from sequence x. In particular, the receiver 204 comprises an RF module 226, a demodulator 212 and a channel decoder 214. The RF module 226 receives the RF signal transmitted on the link 206 and produces a digital baseband signal, comprising the received symbol sequence y, suitable for use by the demodulator 212. For example, in one implementation where the demodulator 212 is configured to received a digital baseband modulated signal having I and Q components, the RF module 226 performs a down-conversion operation to down-convert the RF signal to baseband and to separate out the I and Q components. The RF module 226, in such an implementation, also performs an analog-to-digital (A/D) operation to produce digitized versions of the baseband signals suitable for use by the demodulator 212.

Demodulator 212 estimates the sequence d according to received sequence y. Demodulator 212 also calculates a soft bit for each bit of data represented by a symbol in sequence y. The estimated sequence and soft bits are provided to the channel decoder 214, which uses the soft bit information in error correction routines. However, unlike conventional systems, demodulator 212 does not calculate a series of computationally intensive equations to determine the soft bits or reliability information. Instead, demodulator 212 uses a nearest neighbor symbol table 220 stored in memory 218 included in the receiver 214 to more efficiently calculate the soft bits. Notably, although the demodulator 212 includes the memory 218 in the exemplary embodiment shown in FIG. 2, it is to be understood that the memory 218 can be separate from demodulator 212 in other embodiments.

The memory 218 can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

For a given received symbol $y_m$, processing functionality 216 determines which symbol in the constellation is closest to the received symbol. Processing functionality 216 can be implemented using software, firmware, hardware, or any appropriate combination thereof, as known to one of skill in the art. For example, processing functionality 216 can include or interface with hardware components and circuitry that support the demodulation of received symbol sequence y. By way of example and not by way of limitation, these hardware components can include one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA). As used herein, a table is any data structure for storing data such as, but not limited to, a keyed relational database, a linked list, a flat-file record, etc.

In one implementation of the embodiment shown in FIG. 2, at least a portion of the RF module 226, the demodulator 212, and/or the channel decoder 214 in receiver 204 are implemented in software that executes on a suitable programmable processor. For example, such a programmable processor can be implemented using a digital signal processor (DSP) that executes software that implements at least a portion of the functionality described herein as being performed by the RF module 226, the demodulator 212, and/or the channel decoder 214. Such software comprises a plurality of program instructions tangibly embodied on a processor-readable medium. In other examples, the programmable processor is a part of another type of programmable device such as an ASIC or FPGA. Similarly, in one implementation of the transmitter 202 shown in FIG. 2, at least a portion of the RF module 224, the modulator 210, and/or the channel encoder 208 are implemented in software that executes on a suitable programmable processor.

Processing functionality 216 finds the symbol in the constellation with the minimum distance from the received symbol. The distance between the received symbol and a constellation symbol is denoted herein as $M_{ij}$, where the subscript i is the received symbol index and the subscript j is the constellation symbol index. For example, Table 1 below shows the relationship between the symbol index j, the constellation and the modulated bits for the constellation shown in FIG. 1.

TABLE 1

| Modulated Bits $d_{3i} d_{3i+1} d_{3i+2}$ | Constellation Symbol Index | $I_i$ | $Q_i$ |
|---|---|---|---|
| (1, 1, 1) | 0 | 1 | 0 |
| (0, 1, 1) | 1 | $\frac{1}{\sqrt{2}}$ | $\frac{1}{\sqrt{2}}$ |

TABLE 1-continued

| Modulated Bits $d_{3i} d_{3i+1} d_{3i+2}$ | Constellation Symbol Index | $I_i$ | $Q_i$ |
|---|---|---|---|
| (0, 1, 0) | 2 | 0 | 1 |
| (0, 0, 0) | 3 | $-\frac{1}{\sqrt{2}}$ | $\frac{1}{\sqrt{2}}$ |
| (0, 0, 1) | 4 | $-1$ | 0 |
| (1, 0, 1) | 5 | $-\frac{1}{\sqrt{2}}$ | $-\frac{1}{\sqrt{2}}$ |
| (1, 0, 0) | 6 | 0 | $-1$ |
| (1, 1, 0) | 7 | $\frac{1}{\sqrt{2}}$ | $-\frac{1}{\sqrt{2}}$ |

Similarly, Table 2 below shows the relationship between the symbol index j, the constellation and the modulated bits for the constellation shown in FIG. 3.

TABLE 2

| Modulated Bits $b_{4i} b_{4i+1} b_{4i+2} b_{4i+3}$ | Symbol Index | $Q_i$ | $I_i$ |
|---|---|---|---|
| (0, 0, 0, 0) | 0 | $\frac{1}{\sqrt{10}}$ | $\frac{1}{\sqrt{10}}$ |
| (0, 0, 0, 1) | 1 | $\frac{3}{\sqrt{10}}$ | $\frac{1}{\sqrt{10}}$ |
| (0, 0, 1, 0) | 2 | $-\frac{1}{\sqrt{10}}$ | $\frac{1}{\sqrt{10}}$ |
| (0, 0, 1, 1) | 3 | $-\frac{3}{\sqrt{10}}$ | $\frac{1}{\sqrt{10}}$ |
| (0, 1, 0, 0) | 4 | $\frac{1}{\sqrt{10}}$ | $\frac{3}{\sqrt{10}}$ |
| (0, 1, 0, 1) | 5 | $\frac{3}{\sqrt{10}}$ | $\frac{3}{\sqrt{10}}$ |
| (0, 1, 1, 0) | 6 | $-\frac{1}{\sqrt{10}}$ | $\frac{3}{\sqrt{10}}$ |
| (0, 1, 1, 1) | 7 | $-\frac{3}{\sqrt{10}}$ | $\frac{3}{\sqrt{10}}$ |
| (1, 0, 0, 0) | 8 | $\frac{1}{\sqrt{10}}$ | $-\frac{1}{\sqrt{10}}$ |
| (1, 0, 0, 1) | 9 | $\frac{3}{\sqrt{10}}$ | $-\frac{1}{\sqrt{10}}$ |
| (1, 0, 1, 0) | 10 | $-\frac{1}{\sqrt{10}}$ | $-\frac{1}{\sqrt{10}}$ |
| (1, 0, 1, 1) | 11 | $-\frac{3}{\sqrt{10}}$ | $-\frac{1}{\sqrt{10}}$ |
| (1, 1, 0, 0) | 12 | $\frac{1}{\sqrt{10}}$ | $-\frac{3}{\sqrt{10}}$ |
| (1, 1, 0, 1) | 13 | $\frac{3}{\sqrt{10}}$ | $-\frac{3}{\sqrt{10}}$ |
| (1, 1, 1, 0) | 14 | $-\frac{1}{\sqrt{10}}$ | $-\frac{3}{\sqrt{10}}$ |
| (1, 1, 1, 1) | 15 | $-\frac{3}{\sqrt{10}}$ | $-\frac{3}{\sqrt{10}}$ |

The constellation symbol with the minimum distance is referred to herein as the "closest symbol" and the distance between the closest symbol and the received symbol is also denoted herein as $M_{min}$.

After determining which constellation symbol is the closest symbol, processing functionality 216 looks up, in the table 220 stored in memory 218, a nearest neighbor symbol for each bit in the closest symbol. As used herein, a nearest neighbor symbol is the constellation symbol that reverses the value of the respective bit in the closest symbol and is located with a minimum distance to the closest symbol. For example, Table 3 below is an exemplary table stored in memory 218 for an embodiment implementing the constellation of symbols illustrated in FIG. 1.

TABLE 3

| | Bit index k | | |
|---|---|---|---|
| $j_{min}$ | 0 | 1 | 2 |
| 0 | 1 | 6 | 7 |
| 1 | 0 | 3 | 2 |
| 2 | 0 | 3 | 1 |
| 3 | 5 | 2 | 4 |
| 4 | 5 | 2 | 3 |
| 5 | 4 | 7 | 6 |
| 6 | 4 | 7 | 5 |
| 7 | 1 | 6 | 0 |

In the far left column of Table 3 are listed the constellation symbol index numbers. In the other three columns are listed the nearest neighbor symbol index numbers for each bit in each constellation symbol. For example, the three bit values represented by constellation symbol 2 are 0, 1, and 0 as shown in Table 1. If the closest symbol is constellation symbol 2 (that is $j_{min}$=2), then the nearest neighbor symbol which reverses the value of the first bit is constellation symbol 0 (representing bits 1, 1, and 1), the nearest neighbor symbol for the second bit is constellation symbol 3 (representing bits 0, 0, and 0), and the nearest neighbor symbol for the third bit is constellation symbol 1 (representing bits 0, 1, and 1).

For each soft bit, processing functionality 216 subtracts the distance between the closest symbol and the received symbol (the distance $M_{min}$) from the distance between the nearest neighbor symbol and the received symbol (the distance $M_{ij}$). Thus, the absolute value of the three soft bits for a closest symbol 2 are given by the relatively simple equations $M_{i0}-M_{min}$, $M_{i3}-M_{min}$, and $M_{i1}-M_{min}$. These equations are relatively simple because they do not require calculation of distances between all constellation symbols and the received symbols or a determination of minimum distances for a plurality of group values as in conventional systems. Thus, the embodiments described herein provide a more efficient and less computationally intensive way of calculating soft bit information.

In this example, the above process obtains the absolute value of the soft bits or reliability information. In order to determine the polarity or sense of each soft bit, processing functionality 216 retrieves the polarity data from a polarity table 222 also stored in memory 218 in this embodiment. For example, a polarity table corresponding to the constellation of FIG. 1 is shown in Table 4 below.

TABLE 4

| | Bit index k | | |
|---|---|---|---|
| $j_{min}$ | 0 | 1 | 2 |
| 0 | -1 | -1 | -1 |
| 1 | -1 | -1 | 1 |
| 2 | -1 | 1 | -1 |
| 3 | -1 | 1 | 1 |
| 4 | 1 | -1 | -1 |
| 5 | 1 | -1 | 1 |
| 6 | 1 | 1 | -1 |
| 7 | 1 | 1 | 1 |

Thus, for the example described above with the closest symbol being constellation symbol 2, the polarity applied to the respective soft bits is -1, 1, and -1. After applying the polarity to the respective soft bits, demodulator 212 provides the soft bits to channel decoder 214 for use in error correction routines. The process described above to determine soft bits is repeated for each received symbol. Channel decoder 214 provides the decoded data to a data sink 228, such as, but not limited to, a mobile phone, television system, etc.

The process described above can also be used with other modulation schemes that use different constellations. For example, Table 5 below is an exemplary table of nearest neighbor symbols that corresponds to the constellation shown in FIG. 3.

TABLE 5

| | Bit index k | | | |
|---|---|---|---|---|
| $j_{min}$ | 0 | 1 | 2 | 2 |
| 0 | 8 | 4 | 2 | 1 |
| 1 | 9 | 5 | 2 | 0 |
| 2 | 10 | 6 | 0 | 3 |
| 3 | 11 | 7 | 0 | 2 |
| 4 | 8 | 0 | 6 | 6 |
| 5 | 9 | 1 | 6 | 4 |
| 6 | 10 | 2 | 4 | 7 |
| 7 | 11 | 3 | 4 | 6 |
| 8 | 0 | 12 | 10 | 9 |
| 9 | 1 | 13 | 10 | 8 |
| 10 | 2 | 14 | 8 | 11 |
| 11 | 3 | 15 | 8 | 10 |
| 12 | 0 | 8 | 14 | 13 |
| 13 | 1 | 9 | 14 | 12 |
| 14 | 2 | 10 | 12 | 15 |
| 15 | 3 | 11 | 12 | 14 |

Figure 3:
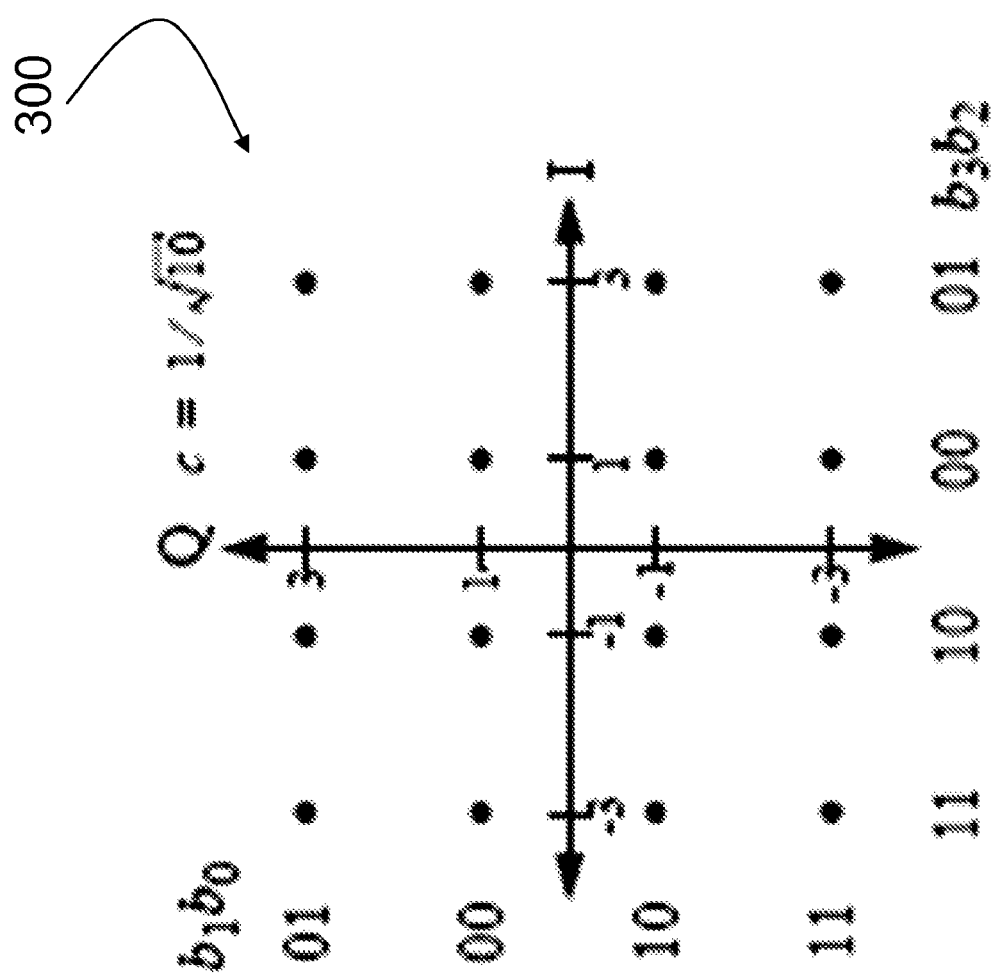
FIG. 3 is a diagram of another example of a constellation.

An exemplary polarity table corresponding to Table 5 and the constellation of FIG. 3 is shown below in Table 6.

TABLE 6

| | Bit index k | | | |
|---|---|---|---|---|
| $j_{min}$ | 0 | 1 | 2 | 3 |
| 0 | -1 | -1 | -1 | -1 |
| 1 | -1 | -1 | -1 | 1 |
| 2 | -1 | -1 | 1 | -1 |
| 3 | -1 | -1 | 1 | 1 |
| 4 | -1 | 1 | -1 | -1 |
| 5 | -1 | 1 | -1 | 1 |
| 6 | -1 | 1 | 1 | -1 |
| 7 | -1 | 1 | 1 | 1 |
| 8 | 1 | -1 | -1 | -1 |
| 9 | 1 | -1 | -1 | 1 |
| 10 | 1 | -1 | 1 | -1 |
| 11 | 1 | -1 | 1 | 1 |
| 12 | 1 | 1 | -1 | -1 |
| 13 | 1 | 1 | -1 | 1 |
| 14 | 1 | 1 | 1 | -1 |
| 15 | 1 | 1 | 1 | 1 |

Figure 4:
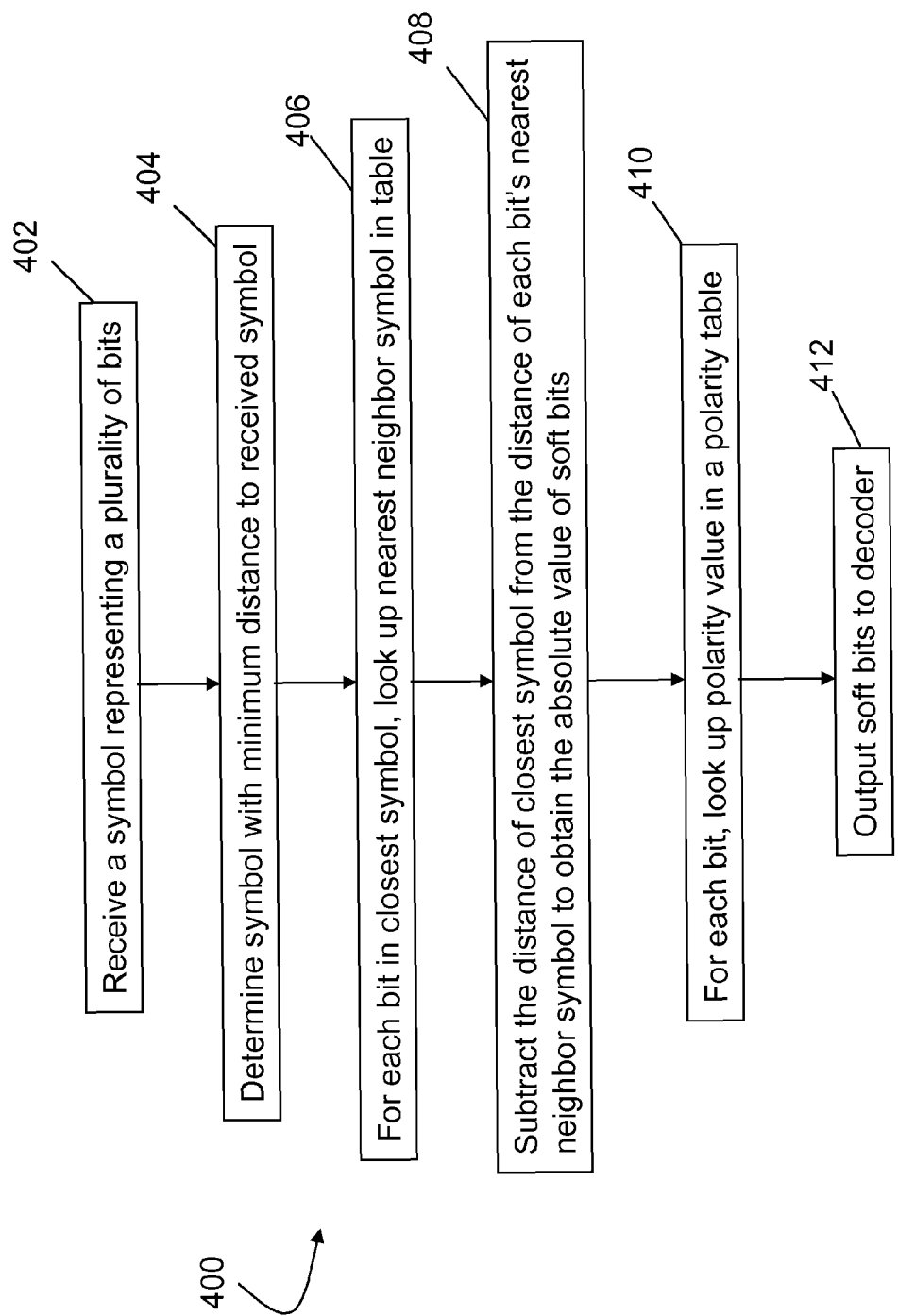
FIG. 4 is a flow diagram depicting one embodiment of a method of calculating reliability information for a received symbol.

FIG. 4 is a flow chart depicting one embodiment of a method 400 of calculating soft bit information. The embodiments of method 400 shown in FIG. 4 are described here as being implemented by demodulator 212 described above in connection with FIG. 2, though other embodiments are implemented in other ways. In this embodiment, all or some portions of method 400 are implemented in program instructions tangibly embodied on a processor-readable medium and executed by processing functionality 216.

At block 402, a demodulator receives a modulated symbol representing a plurality of bits. The symbol is modulated according to a constellation such as PSK or QAM as described above. At block 404, the demodulator determines which symbol in the constellation has the minimum distance to the received symbol (also referred to here as the "closest symbol"). At block 406, for each bit represented by the closest symbol, the demodulator 212 identifies a nearest neighbor symbol that reverses the value of the respective bit based on information stored in the memory device 218. For example, in this implementation, the demodulator 212 looks up the nearest neighbor symbol in a table 220. At block 408, the demodulator 212 subtracts the distance between the closest symbol and the received symbol from the distance between each bit's nearest neighbor symbol and the received symbol to obtain the absolute value of the respective soft bits. At block 410, for each bit represented by the closest symbol, the demodulator 212 looks up polarity data related to the respective soft bit in a polarity table and applies the polarity to the respective soft bit. At block 412, the demodulator 212 provides the soft bits to a decoder for use in error correction of the recovered binary sequence.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A receiver that receives a radio frequency (RF) signal from a communication link, the RF signal including a stream of transmitted symbols modulated onto a carrier, each of the transmitted symbols being selected from a constellation of base symbols to represent a plurality of encoded data bits, the receiver comprising:

a radio frequency (RF) module operable to produce a stream of received symbols derived from the stream of transmitted symbols included within the RF signal;

a demodulator operable to receive the stream of receive symbols and to produce a stream of soft bits derived from the stream of received symbols;

a memory device operable to store information related to a plurality of base symbols in the constellation, the information including a nearest-neighbor look-up table and a polarity look-up table for each data bit represented by a base symbol in the constellation; and a channel decoder operable to receive the stream of soft bits from the demodulator and to produce a stream of decoded data bits derived from the stream of soft bits, wherein for each received symbol in the stream of received symbols the demodulator:

determines which of the plurality of base symbols in the constellation is a closest symbol to the received symbol, the closest symbol including a plurality of first data bits;

calculates a first distance between the received symbol and the closest symbol; and for each first data bit included within the closest symbol, the demodulator:

identifies a nearest neighbor symbol from the nearest-neighbor look-up table stored in the memory device;

calculates a second distance between the received symbol and the nearest-neighbor symbol;

subtracts the first distance from the second distance to produce a first soft bit associated with the first data bit; and applies a polarity value from the polarity look-up table stored in the memory device to the first soft bit, prior to including the first soft bit into the stream of soft bits to be delivered to the channel decoder.

2. The receiver of claim 1, wherein the demodulator is operable to produce the stream of soft bits by using one of a phase-shift keying (PSK) modulation scheme and a Quadrature Amplitude Modulation (QAM) modulation scheme.

3. The receiver of claim 2, wherein the PSK modulation scheme is a Global System for Mobile communications (GSM) 8-PSK modulation scheme.

4. The receiver of claim 2, wherein the QAM modulation scheme is a modulation scheme based on the IEEE 802.16e standard.

5. The receiver of claim 1, wherein the RF module is operable to down-convert the RF signal to a baseband signal.

6. The receiver of claim 5, wherein the RF module is operable to separate the baseband signal into an in-phase (I) component and a quadrature (Q) component.

7. The receiver of claim 1, wherein the demodulator determines an absolute value of each first soft bit prior to applying the polarity value from the polarity look-up table.

8. A communication system comprising:

a transmitter operable to transmit a modulated signal, the transmitter including:

a channel encoder to encode a stream of data bits; and a modulator to map the stream of encoded data bits to a plurality of transmitted symbols from a constellation of base symbols, such that each transmitted symbol in the modulated signal represents a plurality of encoded data bits; and a receiver operable to receive the modulated signal and to derive a stream of received symbols from the stream of transmitted symbols included within the modulated signal, the receiver including:

a demodulator operable to produce a stream of soft bits derived from the stream of received symbols;

a channel decoder operable to produce a stream of decoded data bits derived from the stream of soft bits; and a memory device operable to store information related to a plurality of base symbols in the constellation, the information including a nearest-neighbor look-up table and a polarity look-up table for each data bit represented by a base symbol in the constellation, wherein for each of the received symbols in the stream of received symbols, the demodulator:

determines which of the plurality of base symbols in the constellation is a closest symbol to the received symbol, the closest symbol including a plurality of first data bits;

calculates a first distance between the received symbol and the closest symbol; and for each first data bit included within the closest symbol, the demodulator:

identifies a nearest neighbor symbol from the nearest-neighbor look-up table stored in the memory device;

calculates a second distance between the received symbol and the nearest-neighbor symbol;

subtracts the first distance from the second distance to produce a first soft bit associated with the first data bit, and applies a polarity value from the polarity look-up table stored in the memory device to the first soft bit, prior to including the first soft bit into the stream of soft bits to be delivered to the channel decoder.

9. The communication system of claim 8, wherein the demodulator is operable to produce the stream of soft bits by using one of a phase-shift keying (PSK) modulation scheme and a Quadrature Amplitude Modulation (QAM) modulation scheme.

10. The communication system of claim 9, wherein the PSK modulation scheme is a Global System for Mobile communications (GSM) 8-PSK modulation scheme.

11. The communication system of claim 9, wherein the QAM modulation scheme is a modulation scheme based on the IEEE 802.16e standard.

12. The communication system of claim 8, wherein the transmitter further comprises a transmitting radio frequency (RF) module that up-converts the modulated signal and the receiver further comprises a receiving radio frequency (RF) module that down-converts converts the received modulated signal to a baseband signal including the stream of received symbols.

13. A method of decoding a communications signal having of a stream of transmitted symbols modulated onto a carrier, each of the transmitted symbols being selected from a constellation of base symbols to represent a plurality of encoded data bits, the method comprising:

receiving the communications signal;

deriving a stream of received symbols from the stream of transmitted symbols included within the communications signal;

for each received symbol in the stream of received symbols:

determining which base symbol in the constellation of base symbols has the minimum distance to that received symbol, the closest symbol including a plurality of first data bits;

measuring a first distance between the received symbol and the closest symbol; and for each of the plurality of first data bits represented by the closest symbol:

identifying a nearest neighbor symbol that reverses the value of the first data bit from a nearest-neighbor look-up table; and measuring a second distance between the received symbol and the nearest-neighbor symbol;

subtracting the first distance from the second distance to obtain a soft bit associated with the first data bit;

applying a polarity value from a polarity look-up table to the first soft bit; and incorporating the first soft bit into a stream of soft bits; and deriving a stream of decoded data bits from the stream of soft bits.

14. The method of claim 13, wherein the constellation of base symbols incorporates one of a phase-shift keying (PSK) modulation scheme and a Quadrature Amplitude Modulation (QAM) scheme.

15. The method of claim 14, wherein the modulation scheme is a Global System for Mobile communications (GSM) 8-PSK modulation scheme.

16. The method of claim 14, wherein the QAM modulation scheme is a modulation scheme based on the IEEE 802.16e standard.

17. The method of claim 13, wherein the communications signal is a radio frequency (RF) signal and receiving the communications signal comprises down-converting the RF signal to a baseband signal.

18. The method of claim 17, wherein down-converting the RF signal to a baseband signal further comprises separating the baseband signal into an in-phase (I) component and a quadrature (Q) component.

19. The method of claim 13, further comprising obtaining an absolute value of each first soft bit prior to applying the polarity value from the polarity look-up table.

20. A program product comprising a non-transitory processor-readable medium on which program instructions are embodied, wherein the program instructions are operable, when executed by at least one programmable processor included in a device that demodulates a received communication signals having a plurality of received symbols containing encoded data bits, to cause the device to:

calculate a first distance between each of the plurality of received symbols and a base symbol in a constellation which is closest to the received symbol, the closest symbol representing a plurality of first data bits;

for each first data bit represented by the closest symbol, identify a nearest neighbor symbol that reverses the value of the first data bit based on a nearest-neighbor look-up table retrieved from a memory device;

calculate a second distance between the received symbol and the nearest-neighbor symbol;

subtract the first distance from the second distance obtain a soft bit associated with the first data bit;

apply a polarity value from a polarity look-up table stored in the memory device to the first soft bit; and incorporate the first soft bit into a plurality of soft bits represented by the received symbol; and output the plurality of soft bits for use in decoding the plurality of received symbols.

* * * * *